US 6,734,898 B2

United States Patent
Zeidler

(10) Patent No.: US 6,734,898 B2
(45) Date of Patent: May 11, 2004

(54) METHODS AND APPARATUS FOR THE MEASUREMENT OF VIDEO QUALITY

(75) Inventor: David E. Zeidler, Warrington, PA (US)

(73) Assignee: General Instrument Corporation, Horsham, PA (US)

( * ) Notice: Subject to any disclaimer, the term of this patent is extended or adjusted under 35 U.S.C. 154(b) by 443 days.

(21) Appl. No.: 09/836,728

(22) Filed: Apr. 17, 2001

(65) Prior Publication Data

US 2003/0086001 A1 May 8, 2003

(51) Int. Cl.$^7$ ................................................ H04N 17/00
(52) U.S. Cl. ....................... 348/183; 348/180; 348/181; 348/189; 725/107
(58) Field of Search ................................ 348/183, 180, 348/181, 188, 192, 193, 194, 189, 177, 182, 191, 184; 375/226, 227; 725/107, 109, 110, 114, 115

(56) References Cited

U.S. PATENT DOCUMENTS

| | | | | |
|---|---|---|---|---|
| 3,972,065 A | * | 7/1976 | Heiges et al. ................ | 348/183 |
| 5,353,117 A | * | 10/1994 | Holman et al. .............. | 348/183 |
| 5,446,492 A | * | 8/1995 | Wolf et al. .................. | 348/192 |
| 5,808,671 A | * | 9/1998 | Maycock et al. ............ | 348/180 |
| 5,940,124 A | * | 8/1999 | Janko et al. ................. | 348/189 |
| 6,141,042 A | * | 10/2000 | Martinelli et al. .......... | 348/181 |
| 6,246,435 B1 | * | 6/2001 | Patel .......................... | 348/192 |
| 6,271,879 B1 | * | 8/2001 | Overton ...................... | 348/180 |
| 6,297,845 B1 | * | 10/2001 | Kuhn et al. ................. | 348/192 |
| 6,366,314 B1 | * | 4/2002 | Goudezeune et al. ....... | 348/192 |
| 6,370,367 B1 | * | 4/2002 | Monge-Navarro et al. ........................ | 455/226.1 |
| 6,380,971 B1 | * | 4/2002 | Brodigan .................... | 348/180 |
| 6,441,847 B1 | * | 8/2002 | Link et al. .................. | 348/180 |
| 6,577,764 B2 | * | 6/2003 | Myler et al. ................ | 382/228 |

FOREIGN PATENT DOCUMENTS

WO    WO 00/72453 A1 * 11/2000 ............. H04B/1/00

* cited by examiner

Primary Examiner—Michael H. Lee
Assistant Examiner—Jean W. Désir
(74) Attorney, Agent, or Firm—Barry R. Lipsitz; Douglas M. McAllister

(57) ABSTRACT

The present invention relates to methods and apparatus for measuring the quality of video (e.g., television) signals. In particular, the methods and apparatus of the present invention allow for the measurement of various quality parameters of analog or digital video signals at a set-top terminal 10 or similar device, without the need for external test equipment. A video signal 14, which contains a test signal, is received at a decoder 20. The video signal 14 is decoded and temporarily stored in memory 40. A processor 30 associated with the decoder 20 and the memory 40 analyzes the test signal and calculates a quality parameter for the received video signal 14 based on the test signal. The quality measurements can also be accessed remotely and downloaded, for example, by a cable television provider at a cable television headend. The video quality measurement may include various indicators of end-to-end system performance, including the performance of the set-top terminal 10 or similar device.

14 Claims, 3 Drawing Sheets

METHODS AND APPARATUS FOR THE MEASUREMENT OF VIDEO QUALITY

BACKGROUND OF THE INVENTION

The present invention relates generally to video signals. More specifically, the present invention relates to methods and apparatus for measuring the quality of video (e.g., television) signals. In particular, the methods and apparatus of the present invention allow for the measurement of various quality parameters of analog or digital video signals at a set-top terminal or similar device, without the need for external test equipment. In addition, the quality measurements can also be accessed remotely, for example, by a cable television provider at a cable television headend. The video quality measurement as discussed herein includes various indicators of end-to-end system performance, including the performance of the set-top terminal or similar device.

Currently, measurements of the quality of the video signal received at a user's television or set-top terminal must be made on-site by a technician using test equipment external to the television or set-top terminal. As a result, corresponding expenditures of time and money are associated with the manufacture of the external test equipment, the manpower needed to travel and perform the on-site testing, and the processing of the test results.

It would be advantageous to provide for measurement of video quality at a set-top terminal or similar on-site device, without the need for test equipment of the type used in prior art systems. It would be further advantageous to allow remote access to such video quality measurements so that no on-site technician is necessary. It would be further advantageous to allow downloading of such remotely accessed information, e.g., by a cable television headend, in order to reduce the time and costs associated with the processing of such data.

The methods and apparatus of the present invention provide the foregoing and other advantages.

SUMMARY OF THE INVENTION

The present invention relates to methods and apparatus for measuring the quality of video (e.g., television) signals. In particular, the methods and apparatus of the present invention allow for the measurement of various quality parameters of analog or digital video signals at a set-top terminal or similar device, without the need for external test equipment. A video signal, which contains a test signal, is received at a decoder. The video signal is decoded and at least the test signal portion of the video signal is temporarily stored in memory. A processor associated with the decoder and the memory analyzes the test signal and calculates a quality parameter for the received video signal based on the test signal at the processor. In this manner, video quality can be measured without external test equipment. The quality measurements can also be accessed remotely and downloaded, for example, by a cable television provider at a cable television headend. The video quality measurement as discussed herein includes various indicators of end-to-end system performance, including the performance of the set-top terminal or similar device.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

Figure 1:
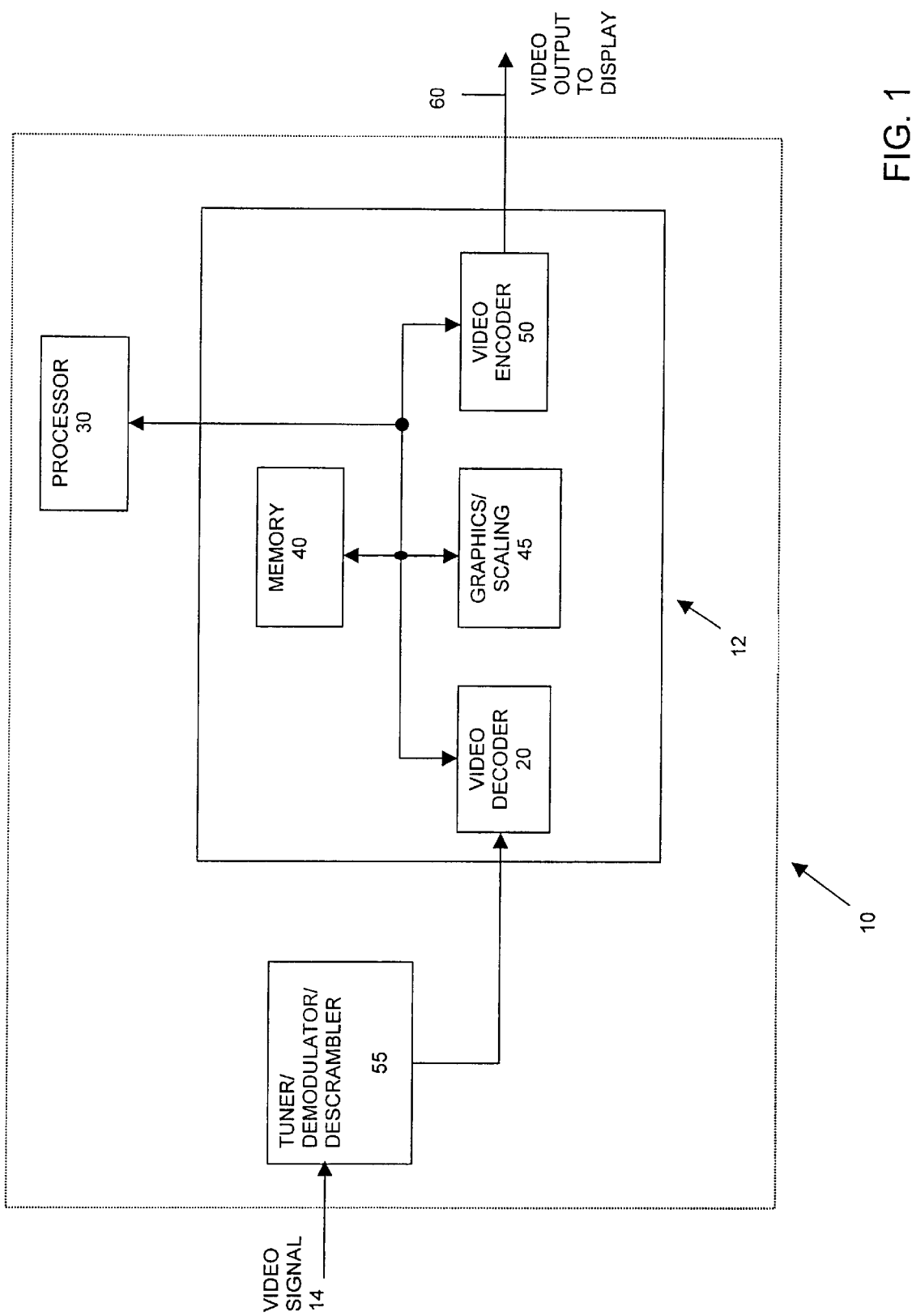
FIG. 1 shows a block diagram of an exemplary embodiment of the invention.

In an exemplary embodiment of the invention as shown in FIG. 1, video quality is measured at a set-top terminal 10 or similar device which receives a video signal 14. The video signal 14, which contains a test signal, is received at a decoder 20 after being processed in a conventional manner by tuner/demodulator/descrambler 55. The video signal 14 is decoded at decoder 20 and temporarily stored, together or separately from the test signal, in memory 40. A processor 30 associated with the decoder 20 and the memory 40 analyzes the test signal and calculates a quality parameter for the received video signal 14 based on the test signal. A video encoder 50 in conjunction with a graphics/scaling processor 45 provides video output 60 for display in a conventional manner on a display device (e.g., a television). No external test equipment is needed to measure video quality.

FIG. 1 shows the invention implemented in the graphics system 12 of a set-top terminal 10. Those skilled in the art will appreciate that the invention may also be implemented as a stand-alone device adapted to receive a television (or other video or multimedia) signal, e.g., from a set-top terminal. In the alternative, the device functionality may be included as part of a television, a personal versatile recorder (PVR), a personal computer, a personal digital assistant (PDA), or similar device (either wired or wireless) having the capability to receive and decode a video signal.

Figure 2:
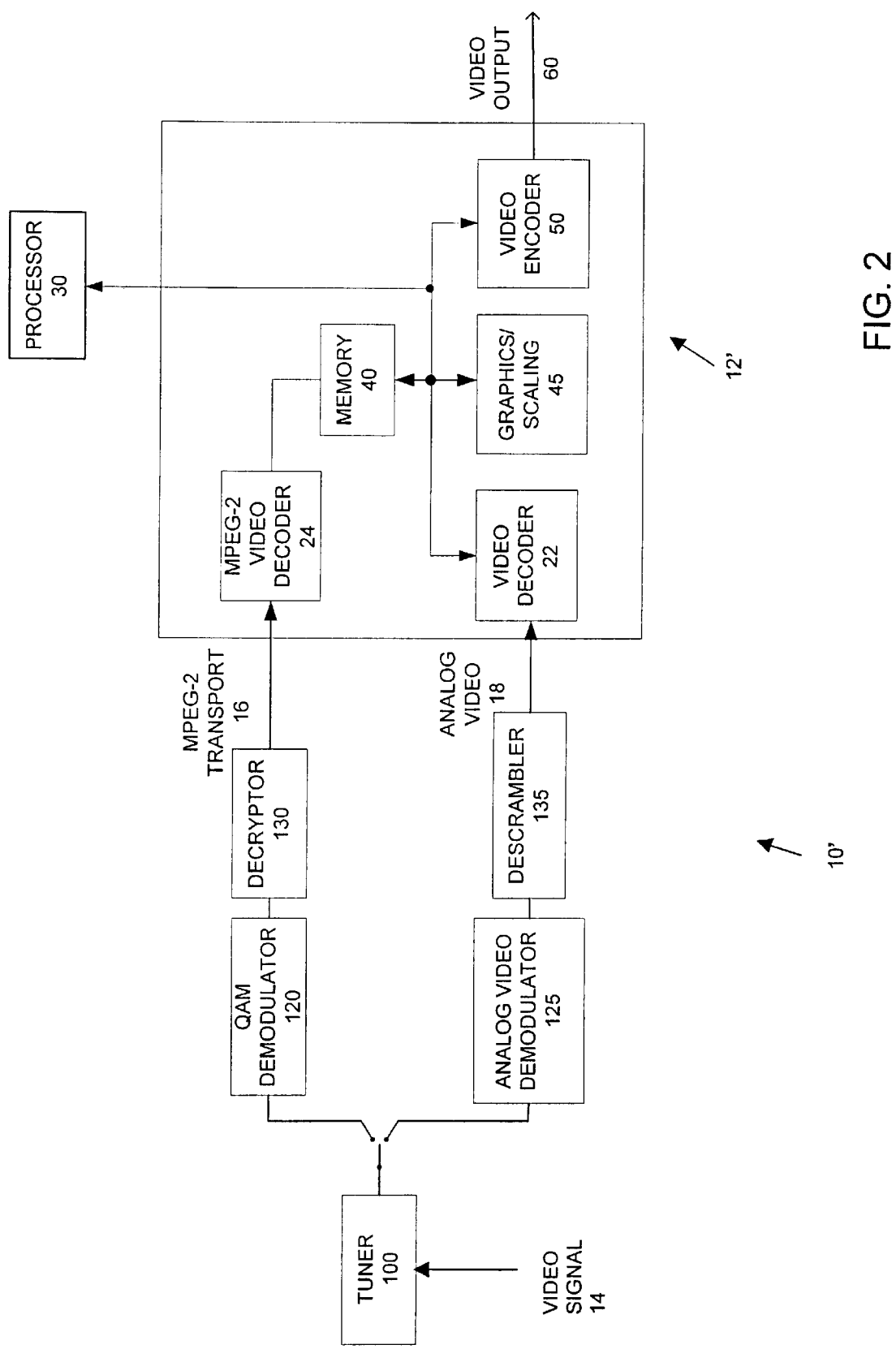
FIG. 2 shows a block diagram of a further embodiment of the invention.

FIG. 2 shows a further embodiment of the invention wherein the video signal 14 may comprise either an analog or a digital signal. FIG. 2 shows the invention implemented in the graphics system 12' of a set-top terminal 10'. The video signal containing the test signal is received at a tuner 100 in a conventional manner. In an embodiment where the video signal 14 is an analog signal, the tuner 100 provides the video signal to an analog video demodulator 125 and descrambler 135 for demodulating and descrambling in a conventional manner. The resultant analog video signal 18 is converted to a digital signal at decoder 22, which includes an analog to digital (A/D) converter (or more sophisticated digital encoder) at the front end thereof. The digital signal is then separated into digital component samples, which are temporarily stored in the memory 40. The processor 30 calculates the quality parameter based on the test signal carried in the original video signal 14 using one or more digital component samples. Alternately, the digital signal can be transferred to memory 40 without being separated into digital component samples, and the quality parameter can be calculated using this unseparated (composite) digital signal information.

Where the video signal 14 containing a test signal is a digital signal, the tuner 100 provides the digital signal to demodulator 120 and decryptor 130 for demodulating and decrypting in a conventional manner. The digital signal (e.g., MPEG-2 transport stream 16) is decoded at decoder 24 and temporarily stored in memory 40. The processor 30 calculates the quality parameter based on the test signal and the stored digital signal or component samples thereof.

The invention is compatible with virtually all types of test signals, a wide variety of which are known in the art. The type of test signal present in the video signal 14 determines the type of quality parameter which is calculated. The quality parameter may relate to at least one of the following impairments: signal to noise ratio of the received video signal, differential phase, differential gain, chrominance/luminance gain, chrominance/luminance delay, chrominance/luminance intermodulation, short time distortion, line time distortion, frequency response, luminance nonlinearity, chrominance nonlinear phase, and chrominance nonlinear gain.

Signal to Noise Ratio (SNR) is a well known indicator of picture "snow" or graininess. Differential phase is an indication that color hue is not reproduced accurately, and is dependent on the luminance/brightness level. Differential gain is an indication that color saturation is not reproduced accurately, and is dependent on the luminance/brightness level. Chrominance/luminance gain is an indication of incorrect color saturation. Chrominance/luminance delay indicates smearing and/or blurring on object edges in the picture. Chrominance/luminance intermodulation is an indicator that the brightness of a picture area is incorrectly affected by the color saturation. Short time distortion indicates ringing, or blurred, vertical edges of a picture, which can incorrectly be displayed as color information, depending on the frequency of the ringing. Line time distortion is an indicator of luminance (brightness) differences in the left and right sides of the picture. Frequency response is an indicator of reduction in the picture detail/resolution. Luminance nonlinearity is an indicator that the brightness scale, from black to white is not ideal, depending on how bright the object is intended to be (i.e. the object is darker or brighter than it should be). This same effect can cause vertical banding or striping. Chrominance nonlinear phase indicates that an object's color hue is incorrectly affected by its saturation (e.g., a deep red apple wouldn't be exactly red in tint). Chrominance nonlinear gain is an indicator that an object's color saturation is incorrectly affected by its saturation (e.g., a deep red apple would be too deep red).

Where the video signal 14 is a digital signal, the quality of the signal is generally not affected by the distribution system or the front end of the set-top terminal (i.e. the tuner 100, demodulator 120, or decryptor 130) as is an analog signal. However, the invention can also be used to measure degradations in the video quality of a digital signal, including for example, impairments in the originating analog source before digital conversion and compression, analog processing at the source before digital conversion and compression, and any compression or decompression impairments that would be manifested in the test signal and measurement capabilities as delineated with respect to the analog source case discussed above.

Figure 3:
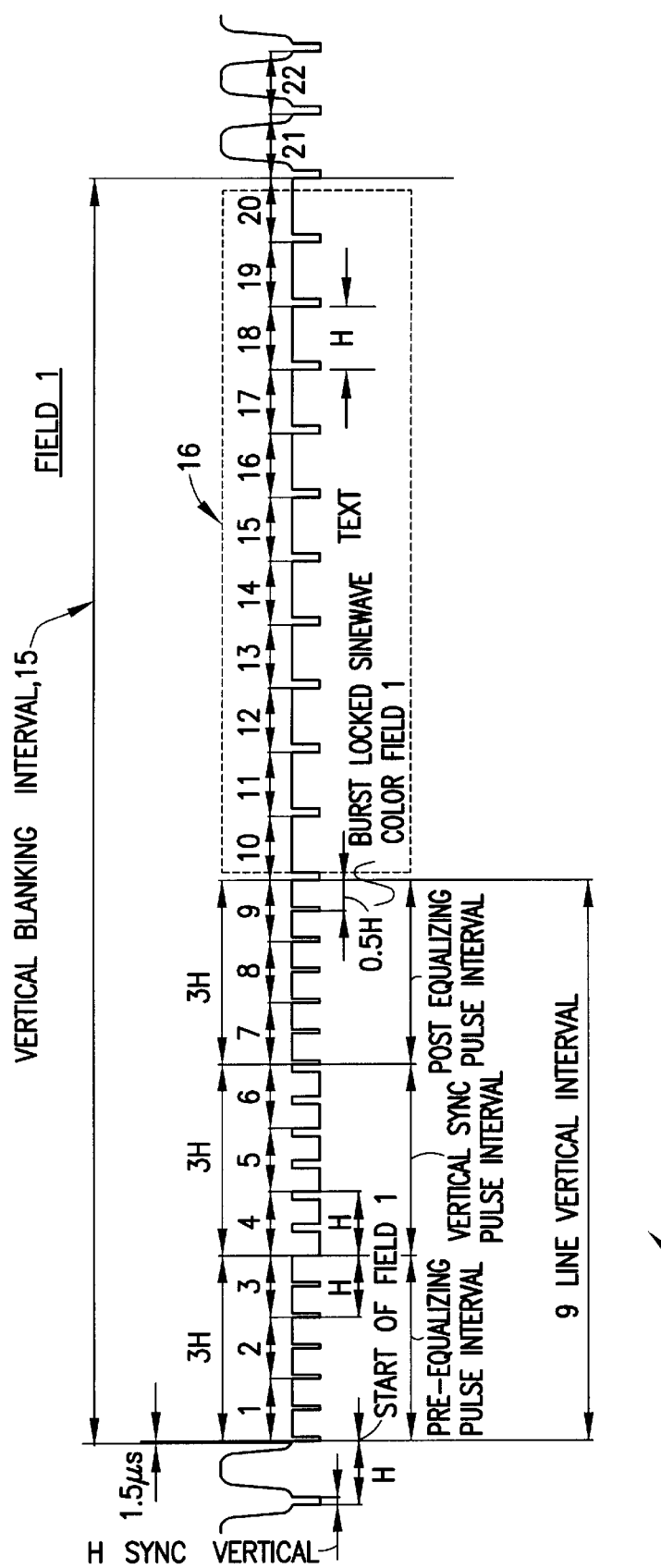
FIG. 3 shows the location of a test signal in a standard NTSC analog television signal.

As shown in FIG. 3, the video signal may be a National Television Systems Committee (NTSC) video signal 14. The test signal may comprise a vertical interval test signal (VITS) carried in the vertical blanking interval (VBI) 15 of the NTSC video signal 14. For clarity, FIG. 3 shows only one field of a standard NTSC analog television signal 14.

The test signal may be contained in portion of the VBI as shown at 16, which indicates possible VITS lines for the test signal (e.g., lines 10–20 of field 1). It should be understood by those skilled in the art that the test signal may also be carried in the VITS lines of the remaining fields of the analog signal 14.

In a digital signal, the test signal may be embedded in the compressed video syntax in any manner deemed appropriate, such as in a "reserved" portion of the syntax.

The quality parameter may be displayed as an on-screen diagnostic display on a display device (e.g., television screen). Alternatively, the quality parameter may be communicated to a remote location.

The quality parameter may also be stored in memory 40. In this instance, the stored quality parameter may be accessed from a remote location, such as a cable television headend. Remote access may be provided by any suitable means, such as a cable or wireless return path, telephone return line, or the like. Further, the stored remotely accessed quality parameter may be downloaded at said remote location from said memory.

It should now be appreciated that the present invention provides advantageous methods and apparatus for measuring the quality of a received video signal without the need for external test equipment. A test signal is provided in the otherwise normal video signal sent to the user site. A processor portion of the user terminal, for example, can perform the necessary algorithm to analyze the received test signal for one or more quality parameters thereof. The present invention further advantageously provides for the remote accessing and, if desired, downloading of such quality measurements from a remote location.

Although the invention has been described in connection with various illustrated embodiments, numerous modifications and adaptations may be made thereto without departing from the spirit and scope of the invention as set forth in the claims.

What is claimed is:

1. A method for the measurement of video quality, comprising the steps of:

receiving via a network a video signal at a decoder, said video signal containing a test signal;

decoding said video signal;

temporarily storing at least the test signal portion of the video signal in memory;

analyzing the test signal at a processor associated with the decoder to determine a type of the test signal;

calculating a quality parameter associated with the type of the test signal for the received video signal based on the test signal at the processor;

storing the quality parameter in memory; and accessing the stored quality parameter from a remote location.

2. A method in accordance with claim 1, wherein the video signal is an analog signal, comprising the further steps of:

converting the analog signal to a digital signal;

separating the digital signal into digital component samples; and the storing step temporarily stores the digital component samples in the memory.

3. A method in accordance with claim 1, wherein the quality parameter relates to at least one of signal to noise ratio of the received video signal, differential phase, differential gain, chrominance/luminance gain, chrominance/luminance delay, chrominance/luminance intermodulation, short time distortion, line time distortion, frequency response, luminance nonlinearity, chrominance nonlinear phase, and chrominance nonlinear gain.

4. A method in accordance with claim 1, wherein:
the video signal is a digital signal; and
the test signal is embedded in the compressed video syntax of the digital signal.

5. A method in accordance with claim 1, wherein:
the video signal is a National Television Systems Committee (NTSC) video signal; and
the test signal is a vertical interval test signal (VITS) carried in the vertical interval of the video signal.

6. A method in accordance with claim 1, comprising the further step of:
displaying the quality parameter as an on-screen diagnostic display.

7. A method in accordance with claim 1, comprising the further step of:
downloading said stored quality parameter at said remote location from the memory.

8. Apparatus for providing a measurement of video quality, comprising:
a receiver for receiving via a network a video signal containing a test signal;
a decoder for decoding said received video signal;
memory for temporarily storing at least the test signal portion of the decoded video signal; and
a processor associated with the memory for:
analyzing the test signal to determine a type of the test signal, and
calculating a quality parameter associated with the type of the test signal for the received video signal based on the test signal;
wherein:
the quality parameter is stored in said memory; and
the stored quality parameter is accessed from a remote location.

9. Apparatus in accordance with claim 8, wherein:
the video signal is an analog signal;
the analog video signal is converted to a digital signal;
the digital signal is separated into digital component samples; and
the digital component samples are temporarily stored in the memory.

10. Apparatus in accordance with claim 8, wherein the quality parameter relates to at least one of the signal to noise ratio of the received video signal, differential phase, differential gain, chrominance/luminance gain, chrominance/luminance delay, chrominance/luminance intermodulation, short time distortion, line time distortion, frequency response, luminance nonlinearity, chrominance nonlinear phase, and chrominance nonlinear gain.

11. Apparatus in accordance with claim 8, wherein:
the video signal is a digital signal; and
the test signal is embedded in the compressed video syntax of the digital signal.

12. Apparatus in accordance with claim 8, wherein:
the video signal is a National Television Systems Committee (NTSC) video signal; and
the test signal is a video interval test signal (VITS) carried in the vertical interval of the video signal.

13. Apparatus in accordance with claim 8, wherein:
the quality parameter is displayed as an on-screen diagnostic display.

14. Apparatus in accordance with claim 8, wherein:
said stored quality parameter is downloaded at said remote location from said memory.

* * * * *